United States Patent
Tamesue

(10) Patent No.: US 11,265,522 B2
(45) Date of Patent: Mar. 1, 2022

(54) AUTOFOCUS CONTROL SYSTEM OF PROJECTOR

(71) Applicant: Panasonic Intellectual Property Management Co., Ltd., Osaka (JP)

(72) Inventor: Kazuhiko Tamesue, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 99 days.

(21) Appl. No.: 16/895,472

(22) Filed: Jun. 8, 2020

(65) Prior Publication Data
US 2020/0389629 A1    Dec. 10, 2020

(30) Foreign Application Priority Data
Jun. 10, 2019   (JP) .............................. JP2019-107630

(51) Int. Cl.
*H04N 9/31*    (2006.01)
*H04N 21/422*    (2011.01)

(52) U.S. Cl.
CPC ........... *H04N 9/317* (2013.01); *H04N 9/3194* (2013.01); *H04N 21/42204* (2013.01)

(58) Field of Classification Search
CPC combination set(s) only.
See application file for complete search history.

(56) References Cited

U.S. PATENT DOCUMENTS

| 2005/0231820 | A1* | 10/2005 | Miyasaka | G02B 7/282 359/686 |
| 2005/0286026 | A1 | 12/2005 | Matsumoto et al. | |
| 2010/0026972 | A1* | 2/2010 | Kaneko | G03B 3/00 353/101 |

FOREIGN PATENT DOCUMENTS

| JP | 2004-205681 | 7/2004 |
| JP | 2005-269363 | 9/2005 |
| JP | 2006-10791 | 1/2006 |

* cited by examiner

*Primary Examiner* — Samira Monshi
(74) *Attorney, Agent, or Firm* — Wenderoth, Lind & Ponack, L.L.P.

(57) ABSTRACT

The autofocus control system of a projector includes a projector and an imaging unit. The projector includes a lens actuator that drives a projection lens, and a first controller that projects a first or a second pattern image selected, the second pattern image being mesh-shaped more coarsely than the first pattern image. The imaging unit includes an imaging part that images the first or second pattern image selected to generate imaged data, a user interface part that acquires a zoom magnification, and a second controller that transmits a focus control command to the first controller based on the imaged data. The second controller transmits to the first controller, an instruction signal for selectively projecting the first pattern image when the zoom magnification is smaller than a given magnification, and an instruction signal for selectively projecting the second pattern image when the zoom magnification is the given magnification or larger.

4 Claims, 10 Drawing Sheets

FIG. 3
(a) First pattern image (close pattern) for focus adjustment for short distance imaging
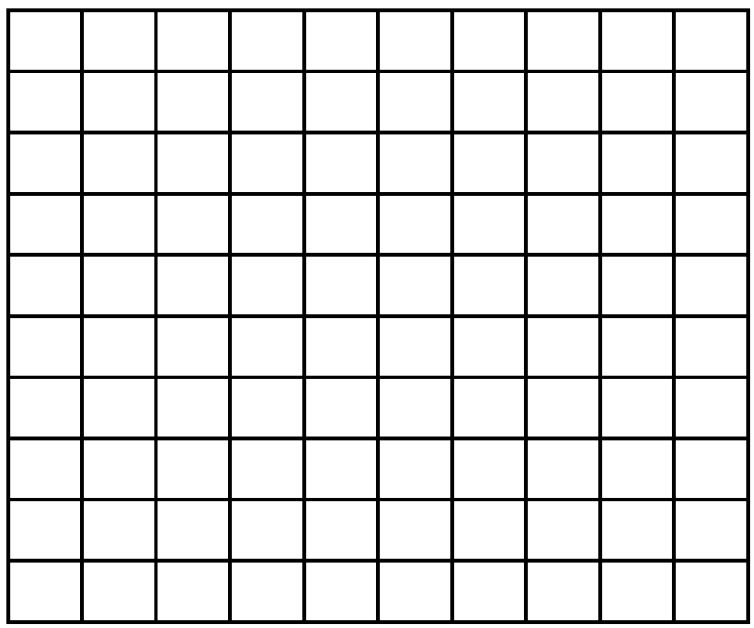
(b) Second pattern image (coarse pattern) for focus adjustment for long distance imaging
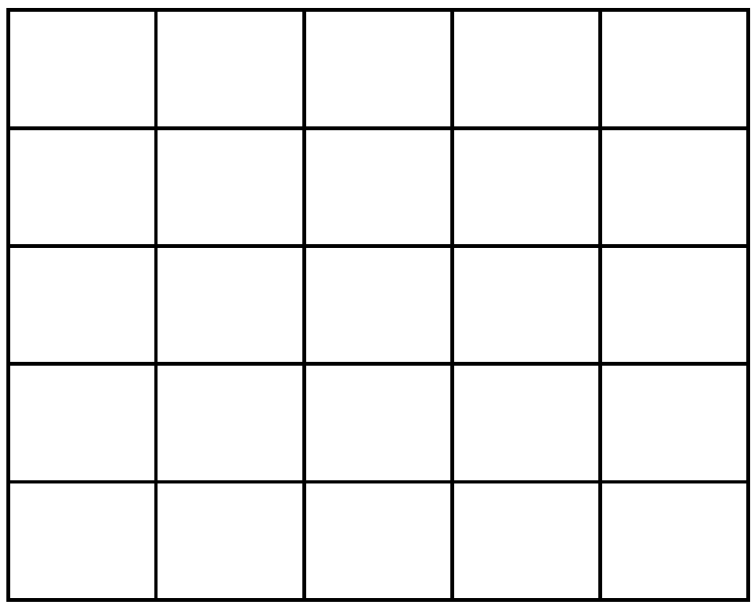

AUTOFOCUS CONTROL SYSTEM OF PROJECTOR

BACKGROUND

1. Technical Field

The present disclosure relates to an autofocus control system that focuses the projection lens of a projector by photographing an image from a projector and analyzing the image.

2. Description of the Related Art

Patent literature (PTL) 1 and patent literature 2 disclose a projector capable of focusing a projection lens by analyzing an image projected in conjunction with the zoom ratio of the projection lens. This projector includes a projection part that projects a focus pattern on a screen, a projection pattern generation part that selects the size of the image elements of the focus pattern in response to information on the zoom adjustment position of the projection part, a camera that images the focus pattern projected on the screen, and a focus control part that automatically performs focus adjustment of the projection lens by analyzing the image imaged by the camera. This allows the projection part to focus by changing the image elements of the focus pattern in conjunction with the zoom ratio of the projection lens for an appropriate level of gray-scale amplitude.

Patent literature 3 discloses a projector capable of focusing a projection lens by analyzing an image projected in conjunction with the zoom ratio of the projection lens. This projector includes a projection part that projects a focus pattern on a screen, a test pattern generation part (the test pattern includes two different density regions alternately placed), a camera that images the focus pattern projected on the screen, and a focus control part that automatically performs focus adjustment of the projection lens by analyzing the image imaged by the camera. This allows the projection part to focus by providing the image elements of the focus pattern with an appropriate level of gray-scale amplitude even if the zoom ratio of the projection lens changes between the near point and the far point.

PTL 1 is Japanese Patent Unexamined Publication No. 2004-205681.

PTL 2 is Japanese Patent Unexamined Publication No. 2005-269363.

PTL 3 is Japanese Patent Unexamined Publication No. 2006-010791.

SUMMARY

The present disclosure provides an autofocus control system that is effective for focus adjustment at a position (independent from the position where the projector is placed) near or distant from a projection surface.

The autofocus control system of a projector according to the first aspect of the disclosure includes a projector and an imaging unit. The projector includes a lens actuator that drives the projection lens to perform focus adjustment, a pattern storage part that stores a first pattern image that is mesh-shaped and a second pattern image that is mesh-shaped more coarsely than the first pattern image, and a first controller that selects the first or second pattern image and projects the first or second pattern image selected on a projection surface through the projection lens. The imaging unit includes an imaging part that images the first or second pattern image selected and projected on the projection surface to generate imaged data, a user interface part that acquires a zoom magnification set by a user, a zoom setting part that makes the imaging part perform zooming based on the zoom magnification having been set, and a second controller that transmits a focus control command to the first controller based on the imaged data generated by the imaging part. The second controller transmits an instruction signal for selectively projecting the first pattern image to the first controller when the zoom magnification is smaller than a given magnification. The second controller transmits an instruction signal for selectively projecting the second pattern image to the first controller when the zoom magnification is the given magnification or larger. The first controller makes the lens actuator actuate the projection lens according to the focus control command acquired from the second controller. The autofocus control system of a projector according to the second aspect of the disclosure includes a projector of the above-described first aspect and an imaging unit. The imaging unit includes an imaging part that images the first or second pattern image selected and projected on the projection surface to generate imaged data, a focus analyzing part that analyzes the imaged data of the first or second pattern image imaged by the imaging part to acquire a focus level, a second controller that transmits a focus control command to the first controller based on the imaged data generated by the imaging part, an application program storage part that stores an autofocus application program, and a user interface part that acquires instruction input from a user. The second controller transmits an instruction signal for selectively projecting the first pattern image to the first controller when the autofocus application program is executed according to the instruction input from the user to the user interface part. The second controller transmits the focus control command based on the imaged data of the first pattern image when the focus level of the first pattern image acquired from the focus analyzing part is a given level or higher. The second controller transmits an instruction signal for selectively projecting the second pattern image instead of the first pattern image to the first controller and transmits the focus control command based on the imaged data of the second pattern image to the first controller when the focus level of the first pattern image acquired from the focus analyzing part is lower than the given level.

An autofocus control system of the present disclosure is effective for focus adjustment at a position (independent from the position where the projector is placed) near and distant from a projection surface.

BRIEF DESCRIPTION OF DRAWINGS

FIG. 3 illustrates pattern images for focus adjustment used in the disclosure.

DETAILED DESCRIPTION

Hereinafter, a detailed description is made of some embodiments with reference to the related drawings as appropriate. However, a detailed description more than necessary may be omitted, such as a description of a well-known item and a duplicate description for a substantially identical component, to avoid an unnecessarily redundant description and to allow those skilled in the art to easily understand the following description.

Note that the accompanying drawings and the following description are provided for those skilled in the art to well understand the disclosure, and it is not intended that the drawings and the description limit the subjects described in the claims.

First Exemplary Embodiment

Hereinafter, a description is made of the first exemplary embodiment using FIGS. 1 through 9.

1-1. Configuration

Figure 1:
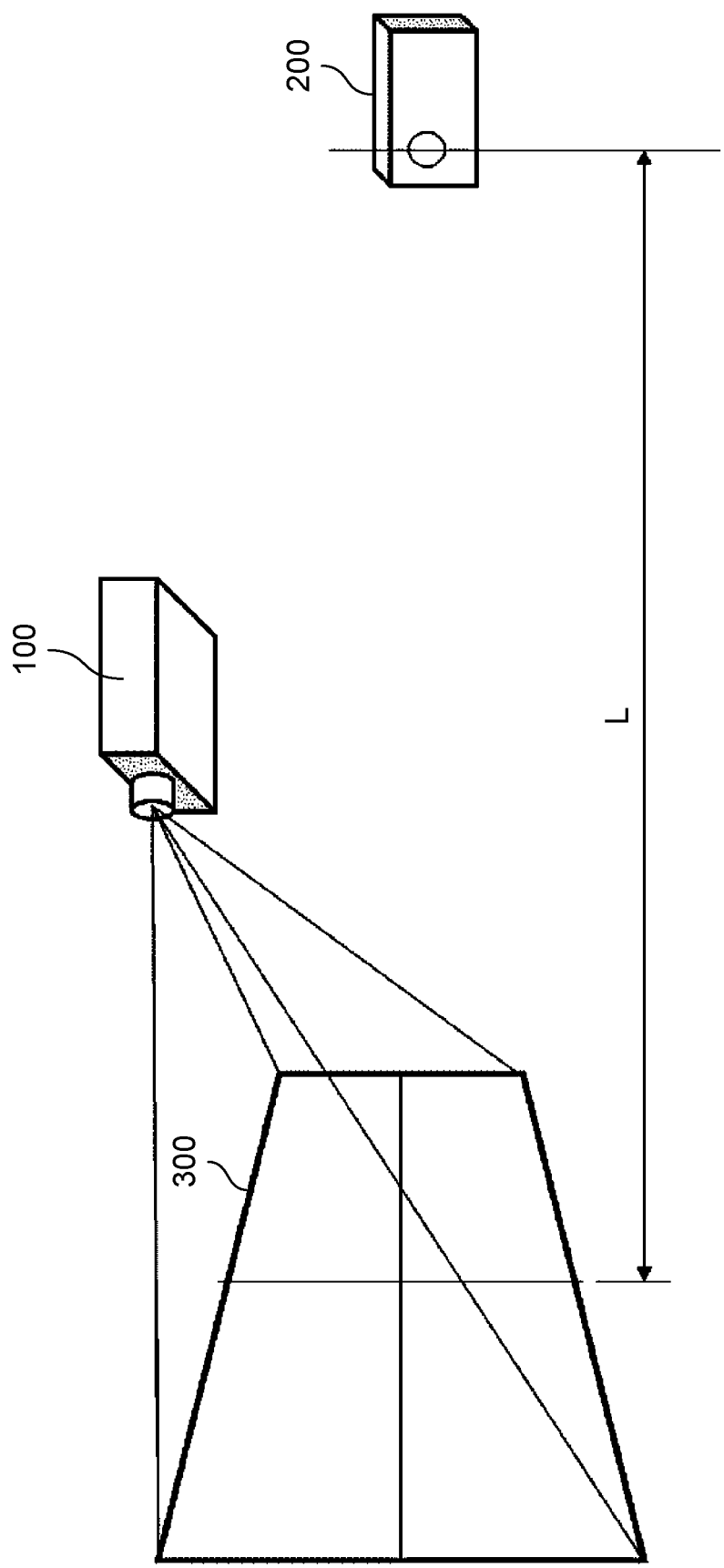
FIG. 1 illustrates an example of the layout of a projector, screen, and an imaging unit.

FIG. 1 is a layout drawing of the devices in the autofocus control system of a projector according to the present disclosure. The basic layout and configuration of the system is the same between this embodiment and the second exemplary embodiment (described later). Projector 100 is suspended from a ceiling for example, or placed on a given support base for example, and enlarge-projects an image on screen 300 (i.e., a projection surface) by means of image light. To perform autofocus control over projector 100, smartphone 200 is used. Smartphone 200 is an example of an imaging unit having an imaging part that images an image projected on the projection surface. Instead of a smartphone, other mobile devices such as a tablet computer and a laptop computer can be used. Smartphone 200 is connected to projector 100 via a wireless LAN (local area network). In FIG. 1, imaging distance L is the distance from screen 300 to the lens of the imaging part of smartphone 200. The connection between smartphone 200 and projector 100 can be also made via a wired LAN besides a wireless LAN.

Figure 2:
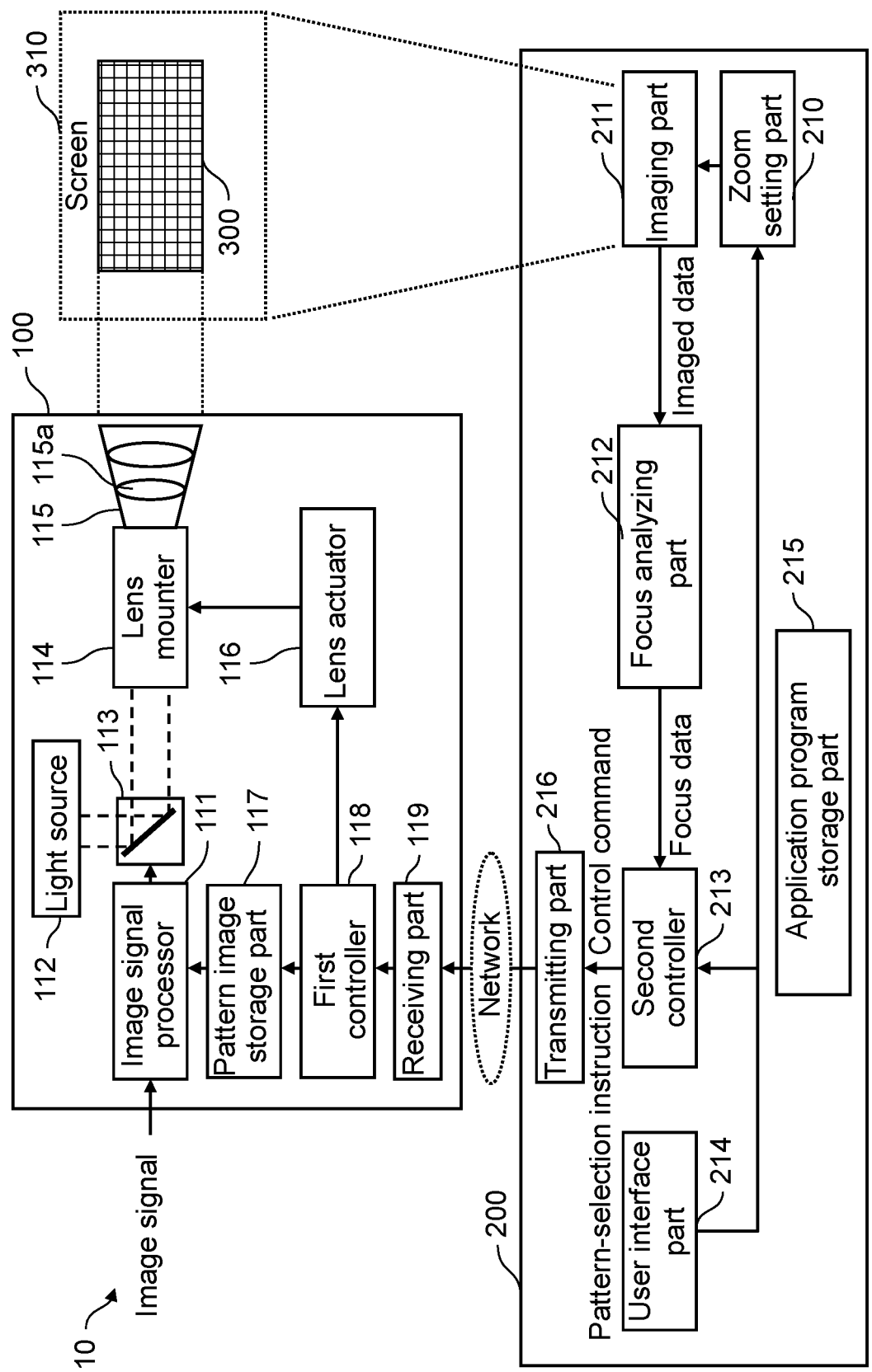
FIG. 2 is a block diagram illustrating the autofocus control system of the present disclosure.

FIG. 2 is a block diagram illustrating autofocus control system 10 according to the first embodiment. Projector 100 includes image signal processor 111 that processes an image signal to be input, light source 112 that is a lamp source (e.g., a high-pressure mercury lamp, metal halide lamp) or a solid light source (e.g., a laser light source, LED light source), and light modulation device 113 that modulates illumination light from light source 112 using an image signal from image signal processor 111. Examples of light modulation device 113 include a DMD (digital micromirror device) and a liquid crystal display panel. Image light emitted from light modulation device 113 is enlarge-projected on screen 300 disposed inside imaging area 310 by means of projection lens 115 attached on lens mounter 114. Projection lens 115 is provided with focus lens 115a, the position of which is moved by lens actuator 116 (e.g., a pulse motor, DC motor). First controller 118 (e.g., a microprocessor) receives an instruction from the smartphone to control actuator 116 and pattern image storage part 117. In this embodiment, the focus lens provided in the projection lens is moved for focus adjustment; however, focus adjustment may be performed by providing the lens mounter with the configuration in which the projection lens (lens barrel) itself is moved in the optical axis direction.

Pattern image storage part 117 stores a first pattern image (mesh-shaped) and a second pattern image (mesh-shaped more coarsely than the first pattern image). FIG. 3 illustrates example pattern images to be stored in pattern image storage part 117. This pattern is a white, lattice-like mesh pattern displayed in a dot-by-dot, black background. FIG. 3 (*a*) shows a first pattern image (close pattern) that is lattice-like with a small line pitch. FIG. 3 (*b*) shows a second pattern image (coarse pattern) that is lattice-like with a line pitch larger than the first one. As described later, pattern image storage part 117 selects one of the first and second pattern images in response to a pattern-selection instruction signal and sends the pattern image to image signal processor 111. The pattern image is projected as image light. In WUXGA resolution (the number of pixels: horizontal (H) 1,920× vertical (V) 1,200) as an example, the first pattern image is set to a line width of (H) 2 and (V) 4, and a line pitch of (H) 12 and (V) 12; the second pattern image is set to a line width of (H) 4 and (V) 6, and a line pitch of (H) 16 and (V) 40.

Projector 100, provided with first controller 118, receives a focus control command to drive-control lens actuator 116. Receiving part 119 receives data transmitted via a wireless LAN.

As shown in FIG. 2, smartphone 200 includes imaging part 211 having optical and digital zoom functions. Imaging part 211 images imaging area 310 that includes the whole or part of screen 300 at a zoom magnification determined by zoom setting part 210. Imaged data obtained from imaging part 211 is input to focus analyzing part 212. Focus data analyzed by focus analyzing part 212 is fed to second controller 213 composed of a CPU and other components. Second controller 213 transmits a focus control command generated based on the focus data to the wireless LAN (receiving part 119) of projector 100 via the wireless LAN (transmitting part 216) through a network. The focus control command is fed to first controller 118. User interface (I/F) part 214 receives instructions from a user through the display screen of smartphone 200.

Application program storage part 215 stores an autofocus application program (hereinafter, also referred to as "AF application"). Focus analyzing part 212 and zoom setting part 210 can be implemented by the AF application.

1-2. Operation

Figure 4:
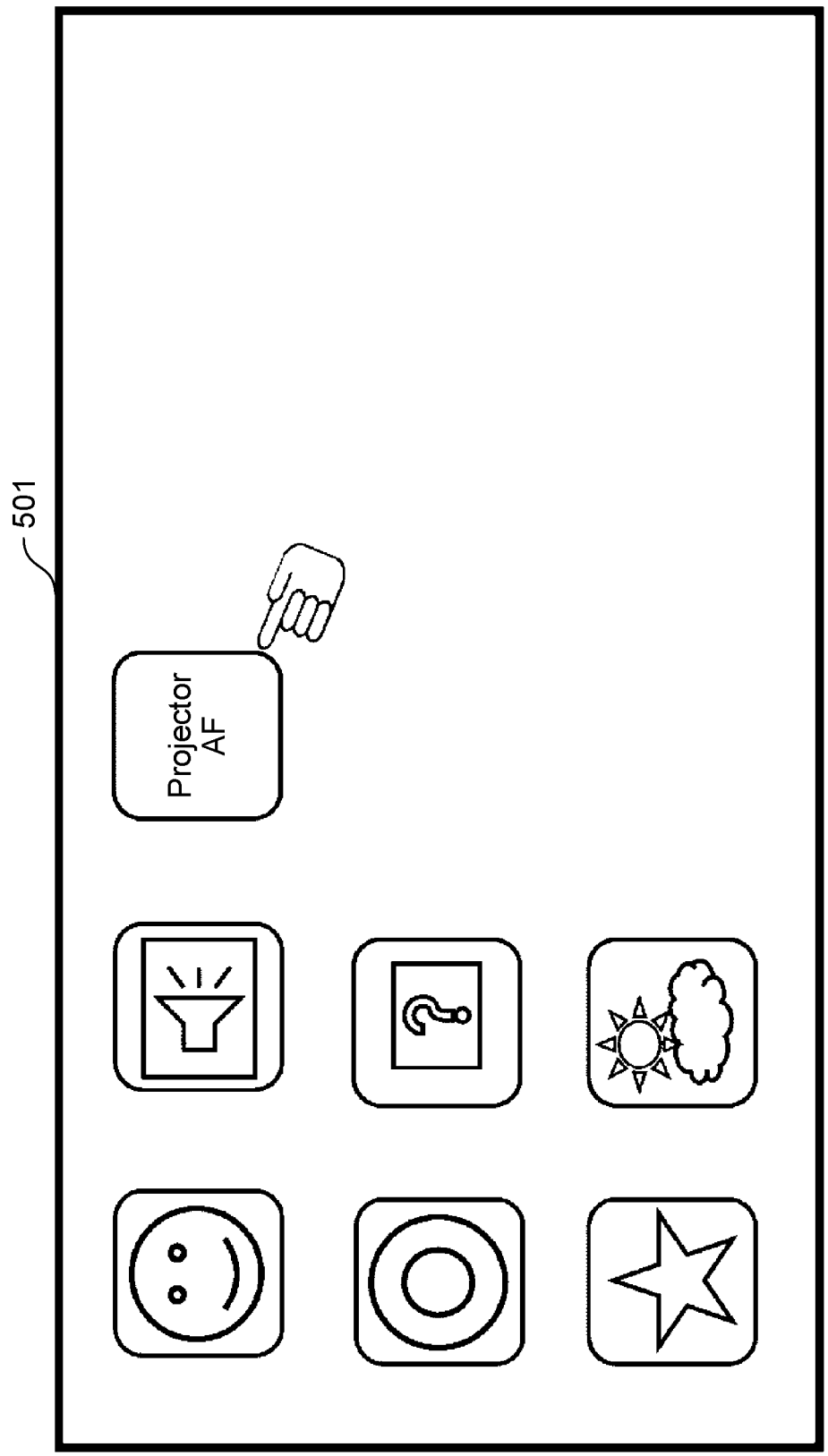
FIG. 4 illustrates the screen of a smartphone.
Figure 5:
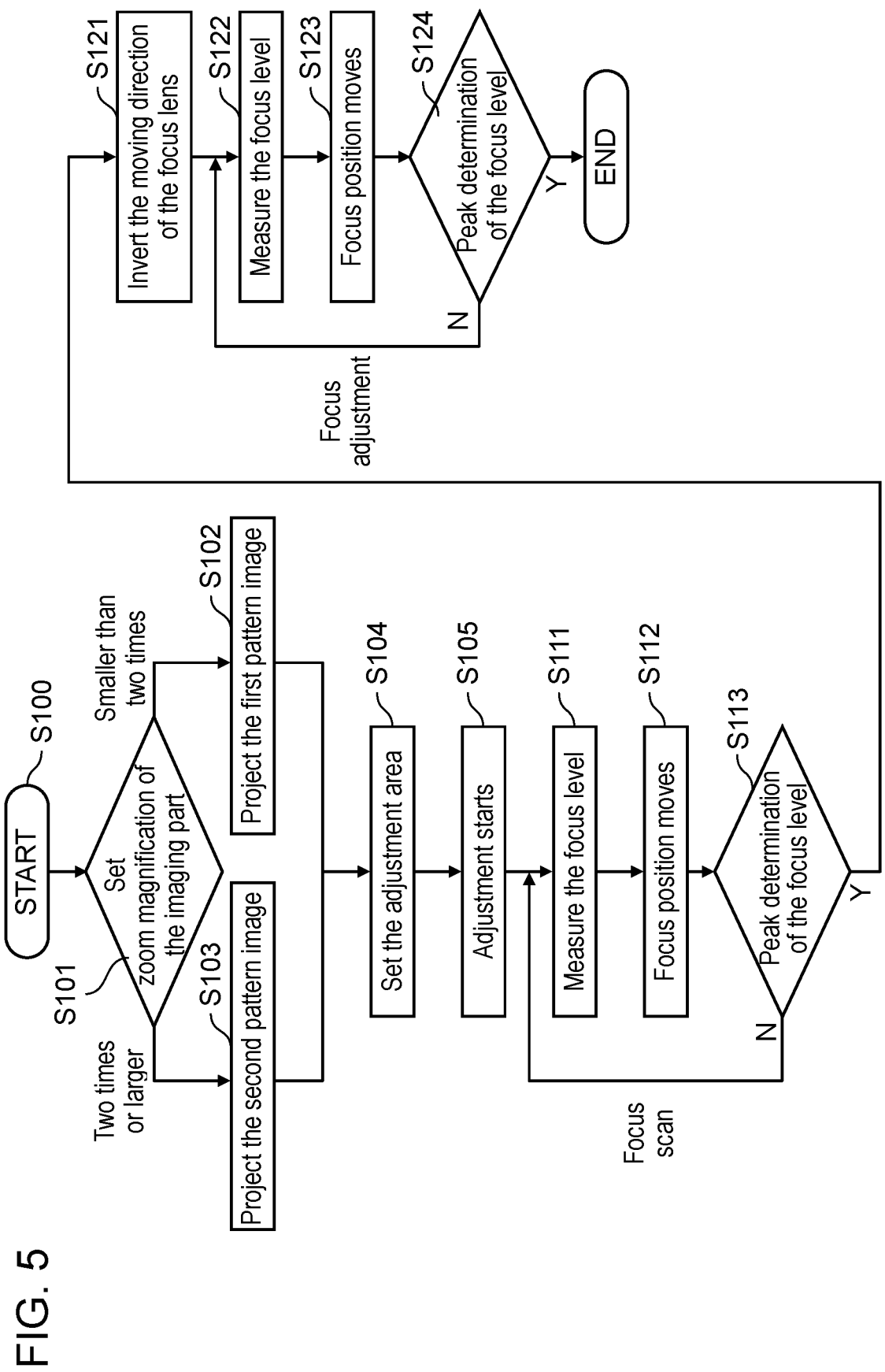
FIG. 5 is an operation flowchart of the autofocus control system according to the first exemplary embodiment.

FIG. 4 shows the display screen of smartphone 200. FIG. 5 shows an operation flowchart related to autofocus control system 10. The display screen (application display area 501) of smartphone 200 shows an icon (Projector AF) for executing the AF application as shown in FIG. 4. Tapping the icon starts executing the AF application (S100).

Figure 6:
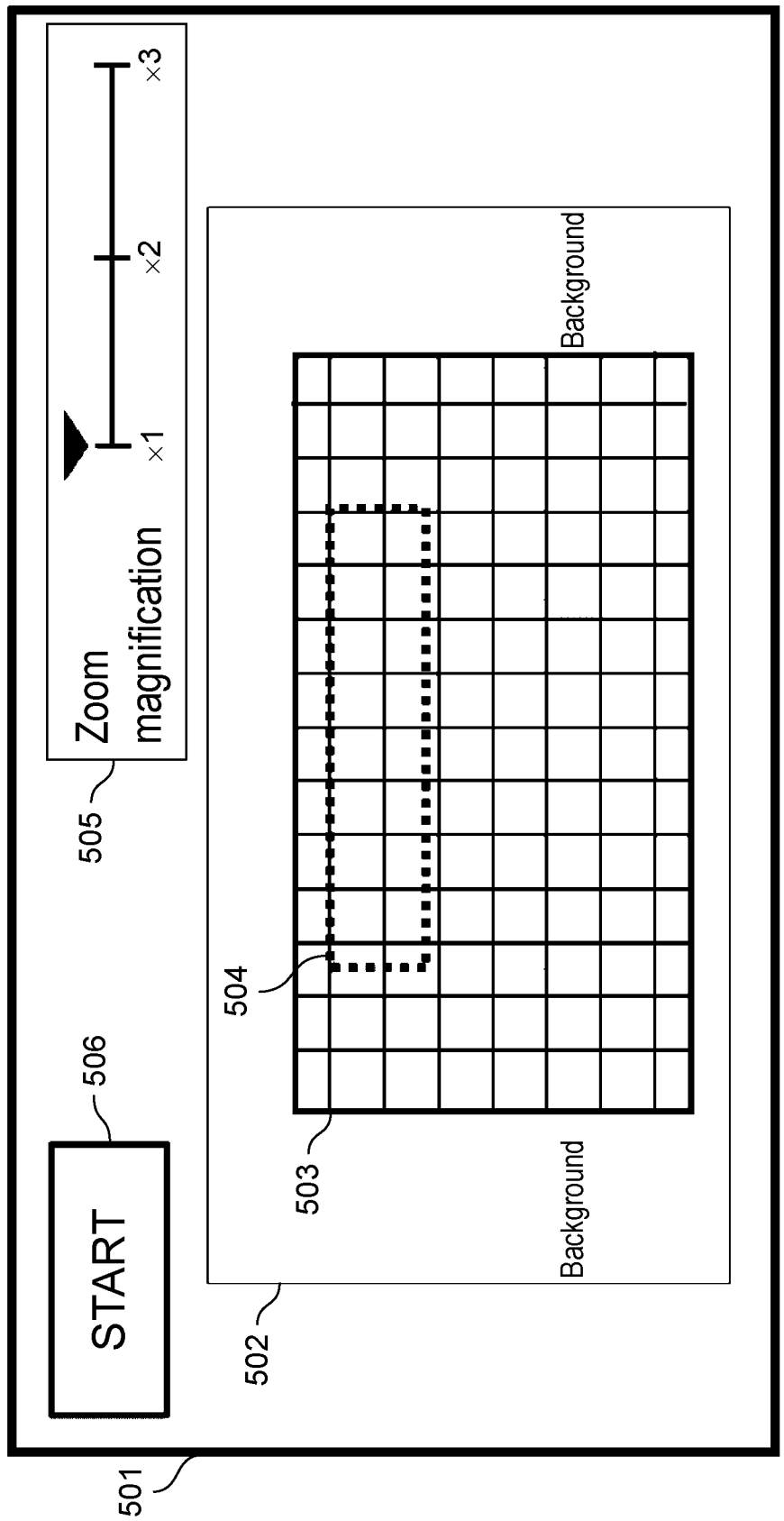
FIG. 6 illustrates a user interface displayed in the screen of the smartphone.
Figure 7:
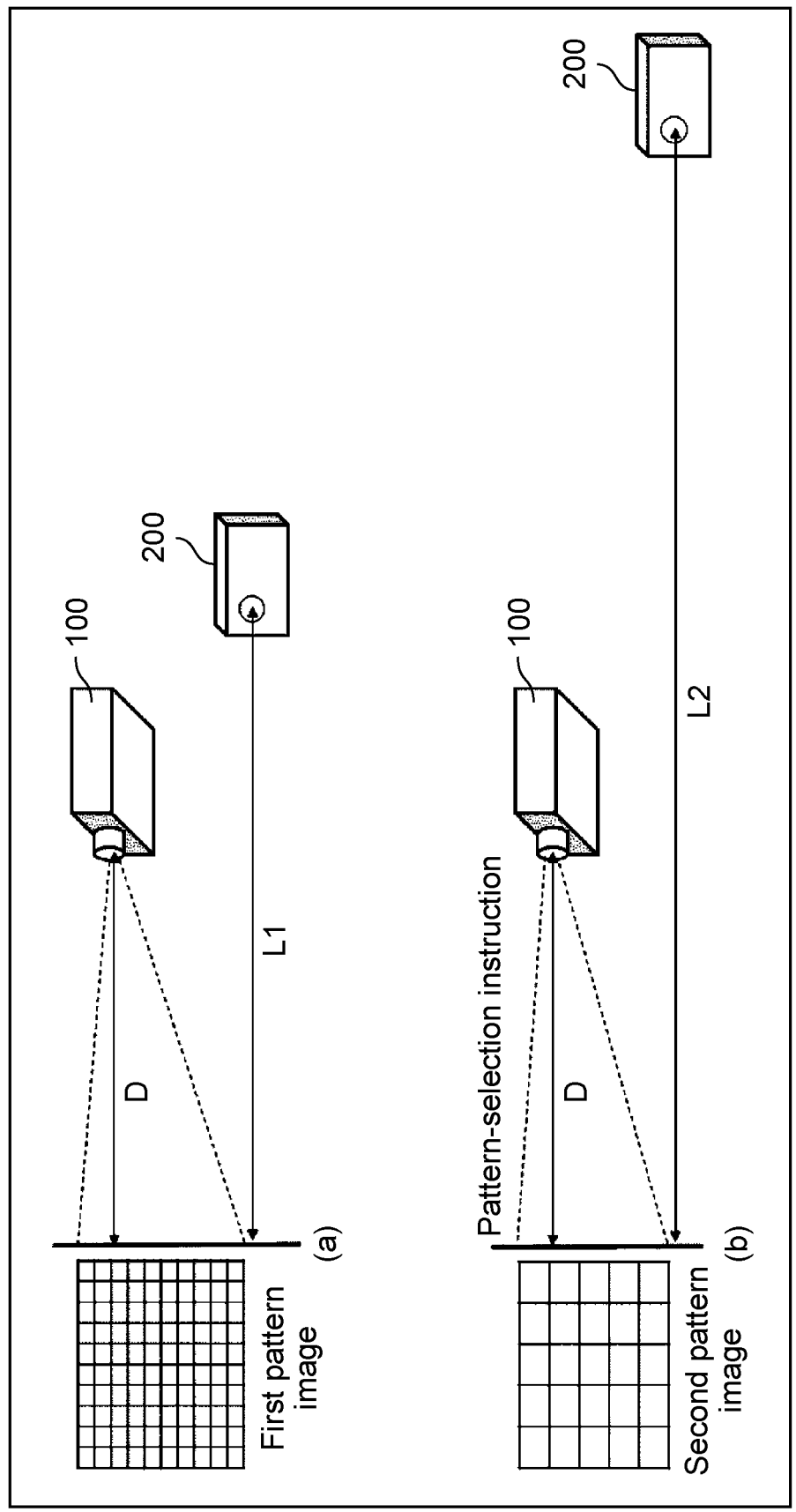
FIG. 7 is an explanatory drawing of imaging distances and pattern images to be used.

When the AF application is started, application display area 501 of smartphone 200 displays a screen as a user interface part for autofocus adjustment shown in FIG. 6. As a user interface part for autofocus adjustment, imaging area 502 including the background displays an image imaged by imaging part 211. In this FIG. 6, imaging area 310 imaged by imaging part 211 and screen image 503 corresponding to screen 300 is displayed. A state where a lattice-like pattern image is displayed is projected in screen image 503.

The AF application is designed to display focus adjustment area 504 that is enclosed by a broken line in imaging area 502. Using drag operation, focus adjustment area 504 can be moved to a user's desired position within imaging area 502. Using pinch-in/pinch-out operation, focus adjustment area 504 can be contracted or magnified. A high-frequency component required for autofocus is acquired from within this focus adjustment area 504. Accordingly, a user can perform optimum focus adjustment at a desired position on the screen.

The focus level output from focus adjustment area 504 has been normalized to a focus level per unit area by dividing a high-frequency component in focus adjustment area 504 by its area size. Thus, the focus level does not change depending on the size of the area.

Application display area 501 displays focus adjustment start button 506 for starting focus adjustment and zoom magnification setting slide bar 505. By dragging an inverted triangle mark (hereinafter, referred to as a triangle mark) displayed on zoom magnification setting slide bar 505 in the right direction, the optical zoom magnification of imaging part 211 can be set to one time to three times by zoom setting part 210.

Referring back to FIG. 5, the AF application starts up and determines what zoom magnification of the imaging part has been set in step (S101). More specifically, the triangle mark is positioned at optical magnification (×1) in a state where the AF application screen in FIG. 6 is displayed. If the triangle mark is long-tapped (hold down) in this state (in step S101, the process flow branches to "magnification smaller than two times"), second controller 213 that has received an instruction from user interface part 214 sends a pattern-selection instruction signal (to select the first pattern image) to first controller 118 of projector 100 via the wireless LAN (transmitting part 216 and receiving part 119). First controller 118, when receiving such a pattern selection signal, selects the first pattern image from pattern image storage part 117 and sends it to image signal processor 111 to project the first pattern image (S102).

In such a way in this embodiment, if the optical magnification is set to one time (×1) or larger and also smaller than two times (×2), the first pattern image is to be selected. The reason is the following. If the imaging distance between screen 300 and smartphone 200 is short like distance L1 in FIG. 7 (a), by projecting the first pattern image with a close lattice, a high-frequency component (focus level) at a sufficient level required for autofocus can be obtained in the zoom range of one time (×1) or larger and also smaller than two times (×2).

Figure 8:
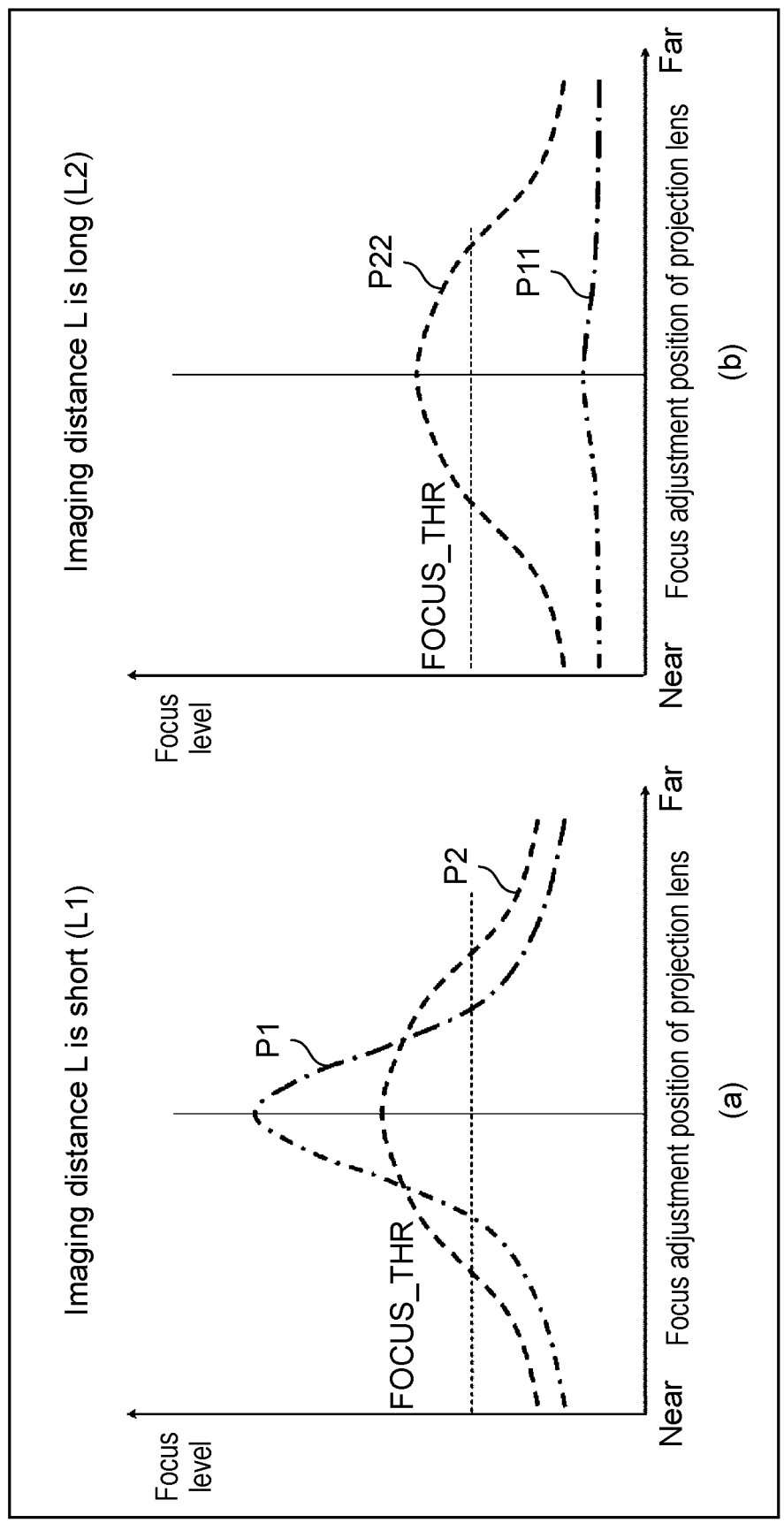
FIG. 8 illustrates the characteristics of the focus level to the focus position.

FIG. 8 illustrates the characteristics of the focus level to the focus position of the projection lens, where the zoom magnification is one time. FIG. 8 (a) shows a case of short imaging distance (L1). Dot-and-dash line P1 indicates the characteristics obtained when the first pattern image is imaged. Broken line P2 indicates the characteristics obtained when the second pattern image is imaged. As shown in this characteristic diagram, if the imaging distance is short (L1), using the first pattern image provides a larger maximum value of the focus level than using the second pattern image.

In a state where the AF application has been started and the AF application screen in FIG. 6 is displayed, if the triangle mark positioned at optical magnification (×1) is dragged in the right direction to move the mark to two times (×2) or larger (in step S101, the process flow branches to "magnification two times or larger"), second controller 213 that has received an instruction from user interface part 214 sends a pattern-selection instruction signal (to select the second pattern image) to first controller 118 of projector 100 via the wireless LAN (transmitting part 216 and receiving part 119). First controller 118, when receiving such a pattern selection signal, selects the second pattern image from pattern image storage part 117 and sends it to image signal processor 111 to project the second pattern image (S103).

In such a way in this embodiment, if the optical magnification is set to two times (×2) or larger and also three times (×3) or smaller, the second pattern image is to be selected. The reason is the following. If the imaging distance between screen 300 and smartphone 200 is distant like distance L2 in FIG. 7 (b), by projecting the second pattern image with a coarse lattice and setting the optical magnification to two times (×2) or larger, a high-frequency component (focus level) at a sufficient level required for autofocus that exceeds the lens resolution of imaging part 211 can be obtained (broken line P22 of FIG. 8 (b)). Note that the distance between screen 300 and projector 100 is a constant distance D independently of the distance between screen 300 and smartphone 200.

FIG. 8 (b) shows a case of long imaging distance (L2). Similarly to FIG. 8 (a), dot-and-dash line P11 indicates the characteristics obtained when the first pattern image is imaged. Broken line P22 indicates the characteristics obtained when the second pattern image is imaged. As shown in this characteristic diagram, if the imaging distance is long (L2), using the second pattern image provides a larger focus level than using the first pattern image. Accordingly, by increasing the optical zoom magnification, the characteristics of broken line P22 in FIG. 8 (b) can be brought closer to those of dot-and-dash line P1 in FIG. 8 (a). Meanwhile, if the first pattern image is used for a case of long imaging distance (L2), the characteristics do not provide a required focus level as shown by dot-and-dash line P11 even if the optical zoom magnification is increased within the limit of the lens resolution of imaging part 211.

Figure 9:
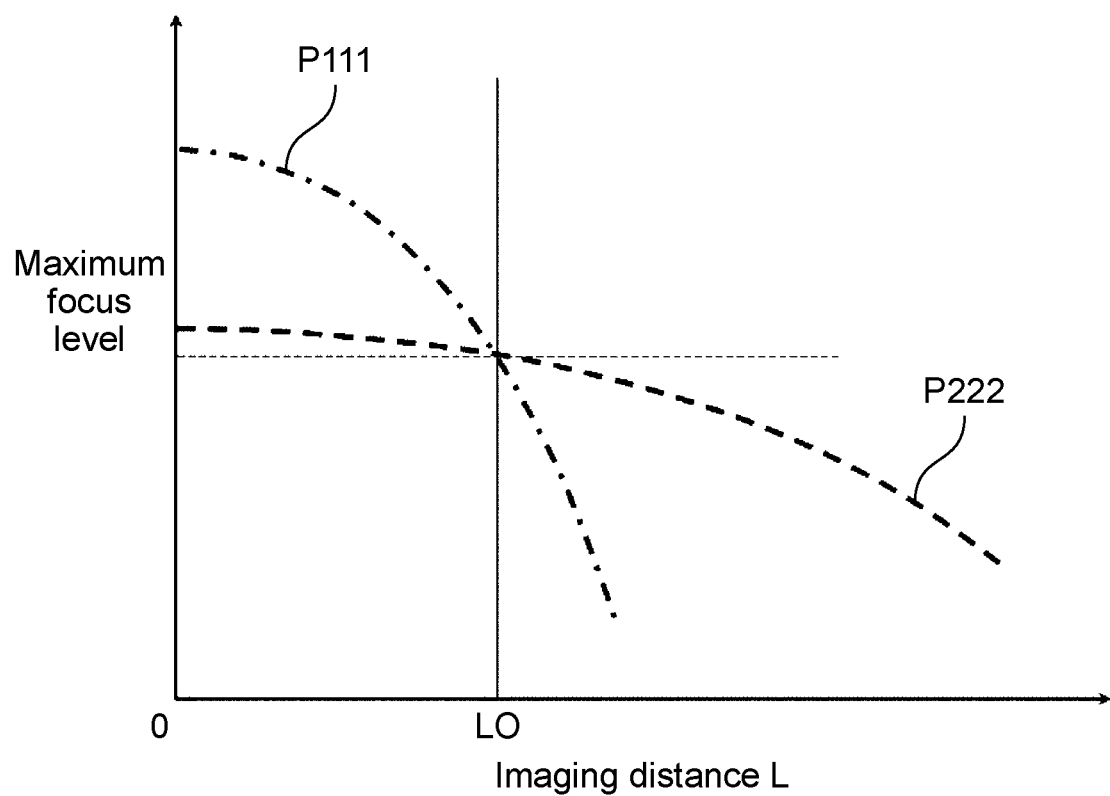
FIG. 9 illustrates the characteristics of the maximum focus level to the imaging distance.

FIG. 9 illustrates the characteristics of the maximum focus level to the imaging distance. Dot-and-dash line P111 indicates the characteristics obtained when the first pattern image is imaged. Broken line P222 indicates the characteristics obtained when the second pattern image is imaged. As shown in this characteristic diagram, the focus level obtained from the first pattern image is to sharply decrease compared to that obtained from the second pattern image for a longer distance than given distance L0. Accordingly, the first pattern image is to be used for an imaging distance of L0 (the cross point of dot-and-dash line P111 and broken line P222) or shorter. The second pattern image is to be used for an imaging distance longer than L0.

Referring back to FIG. 5 again, when the first pattern image is projected (S102), or when the second pattern image is projected (S103), setting for the focus adjustment area is performed by a user's operation (S104). As described above, using drag operation, focus adjustment area 504 can be moved to a user's desired position in screen image 503 within imaging area 502. Using pinch-in/pinch-out operation, focus adjustment area 504 can be contracted or magnified.

When setting for the focus adjustment area is completed and a user taps focus adjustment start button 506, the autofocus control operation is started (S105).

The autofocus control operation is performed in two steps: a focus scan (i.e., coarse adjustment) from steps S111 to S113 and focus adjustment (i.e., fine tuning) from steps S122 to S124.

When the autofocus control operation is started, the focus level is measured from focus data analyzed by focus analyzing part 212 in the focus scan process, the measurement result is stored in memory (S111), the focus lens is driven to move by a given distance (S112), and then peak determination is performed by the filter series method whether an optimum point has been passed based on the focus level acquired in step S111 (S113). In the filter series method, the linear autoregressive model can be used. If the focus level is determined not to be at its peak (No) in step S113, the process flow returns to step S111. Otherwise (Yes), the process flow proceeds to step S121 to invert the moving direction of the focus lens and then moves to the focus adjustment process.

In the focus adjust process, the focus level is measured, the measurement result is stored in memory (S122), the focus lens is driven to move by a given distance (shorter than that in step S112 (S123), and then peak determination is performed by the filter series method whether the focus level is at its optimum point based on the focus level acquired in step S122 (S124). In the filter series method, gradient determination is performed by the least-square method using the focus level acquired in step S122 (S124).

If determination is made that the absolute value of the gradient detected in step S124 is larger than a given threshold, namely not the peak of the focus level (No), the process flow returns to step S122. Then, if determination is made that the focus level is at its peak in step S124 (Yes), the autofocus operation terminates.

Note that the inversion of the focus moving direction (S121) and the focus adjustment operation (S122 to S124) can be repeated again with the moving distance of the focus position in step S123 further decreased. This further increases the accuracy.

1-3. Advantage

In this embodiment, as a result that a user simply performs the zoom operation of the smartphone at a freely chosen position independent of the position where the projector is placed, an optimum pattern image required for autofocus is selectively projected and autofocus is performed, which increases convenience.

Second Exemplary Embodiment 2-1. Configuration

The configuration of the second exemplary embodiment is the same as that of the first one shown in FIGS. 1 through 9, and thus the duplicate description is omitted here.

2-2. Operation

Figure 10:
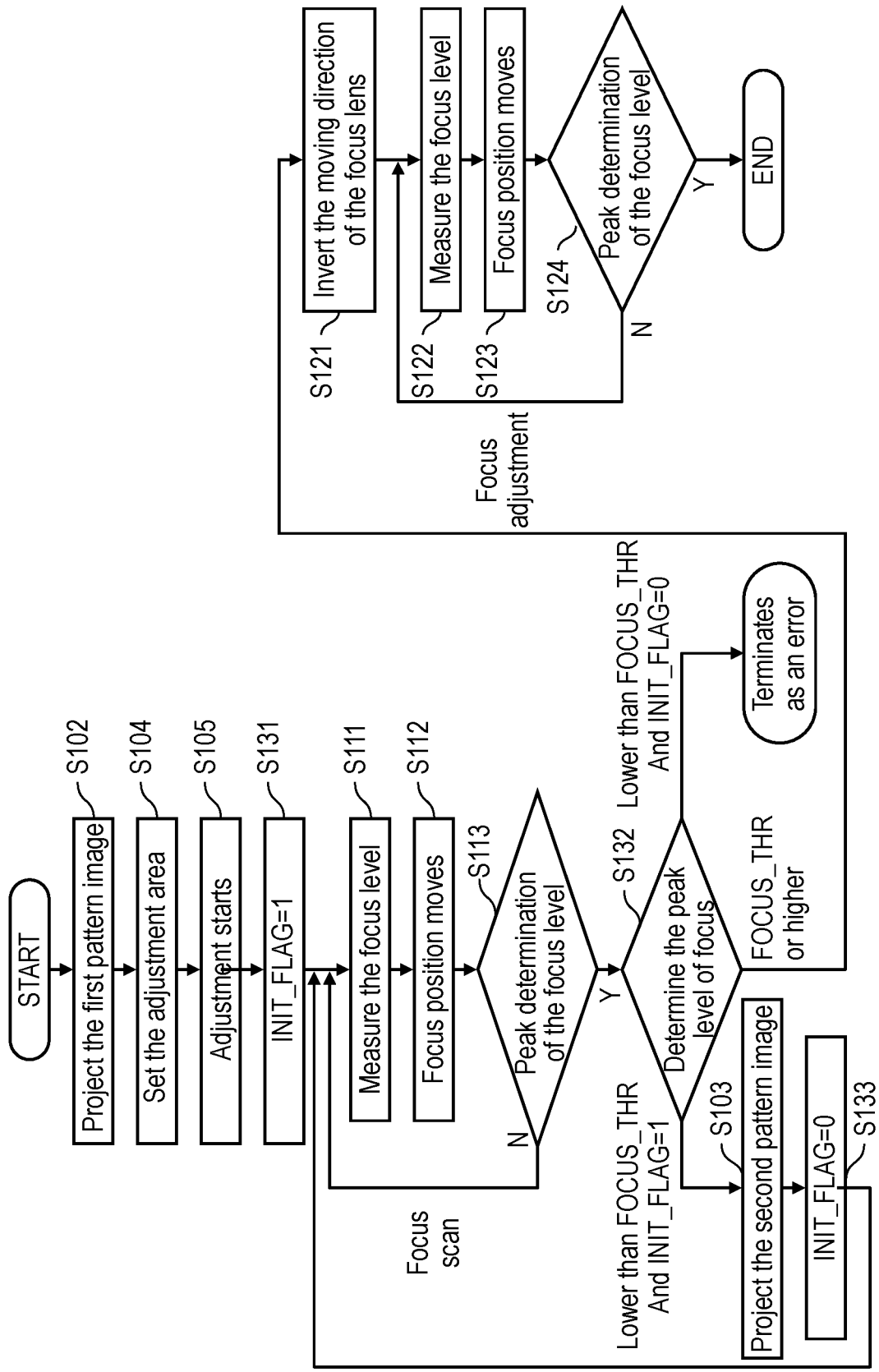
FIG. 10 is an operation flowchart of the autofocus control system according to the second exemplary embodiment.

FIG. 10 is an operation flowchart according to the second exemplary embodiment.

When the icon (Projector AF) displayed on the display screen of smartphone 200 is tapped, the execution of the AF application is started (S101).

When the execution of the AF application is started, second controller 213 that has received an instruction from user interface part 214 sends a pattern-selection instruction signal (to select the first pattern image) to first controller 118 of projector 100 via the wireless LAN (transmitting part 216 and receiving part 119). First controller 118, when receiving such a pattern selection signal, selects the first pattern image from pattern image storage part 117 and sends it to image signal processor 111 to project the first pattern image (S102).

After the first pattern image is projected, setting for the focus adjustment area is performed by a user's operation (S104). Setting for the focus adjustment area 504 is performed as described in the first embodiment. Using drag operation, focus adjustment area 504 can be moved to a user's desired position within imaging area 502. Using pinch-in/pinch-out operation, focus adjustment area 504 can be contracted or magnified. When setting for the focus adjustment area is completed and a user taps focus adjustment start button 506, the autofocus control operation is started (S105).

When the autofocus control operation is started, the initial flag is first set to 1 (INIT_FLAG=1) (S131), followed by the autofocus control operation and the automatic pattern image change operation. The initial flag=1 means the focus scan operation of steps S111 to S113 is executed for the first time.

The autofocus control operation is performed in two steps similarly to the first embodiment: a focus scan (i.e., coarse adjustment) from steps S111 to S113 and focus adjustment (i.e., fine tuning) from steps S122 to S124.

When the autofocus control operation is started, the focus level is measured in the focus scan process, the measurement result is stored in memory (S111), the focus lens is driven to move by a given distance (S112), and then peak determination is performed by the filter series method whether an optimum point has been passed based on the focus level acquired in step S111 (S113). In the filter series method, the linear autoregressive model can be used. If the focus level is determined not to be at its peak (No) in step S113, the process flow returns to step S111. Otherwise (Yes), the process flow proceeds to step S132 to determine the focus level (the peak level of focus).

If the determination is made in step S132 that the focus level is given threshold level (FOCUS_THR) or higher, the process flow proceeds to step S121 to invert the moving direction of the focus lens and then moves to the focus adjustment process.

In the focus adjust process, the focus level is measured, the measurement result is stored in memory (S122), the focus lens is driven to move by a given distance (shorter than that in step S112 (S123), and then peak determination is performed by the filter series method whether the focus level is at its optimum point based on the focus level acquired in step S122 (S124). In the filter series method, gradient determination is performed by the least-square method using the focus level acquired in step S122 (S124).

If the imaging distance is large (L2), the first pattern image provides the characteristics of dot-and-dash line P11 as shown in FIG. 8 (b). As a result, the determination is made in step S132 that the focus level is lower than given threshold level (FOCUS_THR) and the initial flag is 1 (INIT_FLAG=1). At this moment, second controller 213 sends a pattern-selection instruction signal (to select the second pattern image) to first controller 118 of projector 100 via the wireless LAN (transmitting part 216 and receiving part 119). First controller 118, when receiving such a pattern selection signal, selects the second pattern image from pattern image storage part 117 and sends it to image signal processor 111 to project the second pattern image (S103).

When the second pattern image is projected, second controller 213 sets the initial flag to 0 (INIT_FLAG=0) in step S133, and the process flow returns to step S111 in which the focus scan process from steps S111 to S113 is executed again. In the focus scan process at this moment provides the characteristics indicated by broken line P22 shown in FIG. 8 (b) as a result that the second pattern image has been projected, which allows a peak to be detected. In step S132, the focus level is determined. If the determination is made that the focus level is given threshold level (FOCUS_THR) or higher, the process flow proceeds to step S121 to invert the moving direction of the focus lens, executes steps S122 to S124 (i.e., the focus adjustment process), and then terminates. If the determination is made that imaging distance L is further longer than L2, and the focus level is lower than given threshold level (FOCUS_THR) and also the initial flag is 0 (INIT_FLAG=0) in step S132, a required focus level is not considered to be provided whichever pattern image (first or second) is projected, and the process terminates as an error.

Note that the inversion of the focus moving direction (S121) and the focus adjustment operation (S122 to S124) can be repeated with the moving distance of the focus position in step S123 further decreased. This further increases the accuracy.

2-3. Advantage

In this embodiment, as a result that a user simply starts the AF application of the smartphone at a freely chosen position independent of the position where the projector is placed, an optimum pattern image required for autofocus is selectively projected automatically, which allows an appropriate autofocus operation to be performed.

INDUSTRIAL APPLICABILITY

The present disclosure relates to an autofocus control system.

What is claimed is:

1. An autofocus control system of a projector, comprising:
a projector including
a lens actuator that drives a projection lens to perform focus adjustment,
a pattern image storage part that stores a first pattern image that is mesh-shaped and a second pattern image that is mesh-shaped more coarsely than the first pattern image, and
a first controller that selects the first or second pattern image and projects the first or second pattern image selected on a projection surface through the projection lens, and
an imaging unit including
an imaging part that images the first or second pattern image selected and projected on the projection surface to generate imaged data,
a user interface part that acquires a zoom magnification set by a user,
a zoom setting part that makes the imaging part perform zooming based on the zoom magnification having been set, and
a second controller that transmits a focus control command to the first controller based on the imaged data generated by the imaging part,
wherein the second controller transmits an instruction signal for selectively projecting the first pattern image to the first controller when the zoom magnification is smaller than a given magnification,
wherein the second controller transmits an instruction signal for selectively projecting the second pattern image to the first controller when the zoom magnification is the given magnification or larger, and
wherein the first controller makes the lens actuator actuate the projection lens according to the focus control command acquired from the second controller.

2. The autofocus control system of a projector of claim 1,
wherein the first and second pattern images are lattice-like, mesh patterns, and
wherein a line pitch of the second pattern image is larger than a line pitch of the first pattern image.

3. An autofocus control system of a projector, comprising:
a projector including
a lens actuator that drives a projection lens to perform focus adjustment,
a pattern image storage part that stores a first pattern image that is mesh-shaped and a second pattern image that is mesh-shaped more coarsely than the first pattern image, and
a first controller that selects the first or second pattern image and projects the first or second pattern image selected on a projection surface through the projection lens, and
an imaging unit including
an imaging part that images the first or second pattern image selected and projected on the projection surface to generate imaged data,
a focus analyzing part that analyzes the imaged data of the first or second pattern image imaged by the imaging part to acquire a focus level,
a second controller that transmits a focus control command to the first controller based on the imaged data generated by the imaging part,
an application program storage part that stores an autofocus application program, and
a user interface part that acquires instruction input from a user,
wherein the second controller transmits an instruction signal for selectively projecting the first pattern image to the first controller when the autofocus application program is executed according to the instruction input from the user to the user interface part,
wherein the second controller transmits the focus control command based on the imaged data of the first patten image when the focus level of the first pattern image acquired from the focus analyzing part is a given level or higher, and
wherein the second controller transmits an instruction signal for selectively projecting the second pattern image instead of the first pattern image to the first controller and transmits the focus control command based on the imaged data of the second pattern image to the first controller when the focus level of the first pattern image acquired from the focus analyzing part is lower than the given level.

4. The autofocus control system of a projector of claim 3,
wherein the first and second pattern images are lattice-like, mesh patterns, and
wherein a line pitch of the second pattern image is larger than a line pitch of the first pattern image.

* * * * *